United States Patent [19]

Stricharczuk

[11] 4,036,912
[45] July 19, 1977

[54] THERMOPLASTIC POLYMER BLENDS OF EP OR EPDM POLYMER WITH CRYSTALLINE POLYPROPYLENE

[75] Inventor: Paul Thomas Stricharczuk, Solon, Ohio

[73] Assignee: The B. F. Goodrich Company, Akron, Ohio

[21] Appl. No.: 619,806

[22] Filed: Oct. 6, 1975

[51] Int. Cl.² ............................................. C08L 23/00
[52] U.S. Cl. .................................. 260/897 A; 260/889
[58] Field of Search ........................... 260/889, 897 A

[56] References Cited

U.S. PATENT DOCUMENTS 3,904,470  9/1975  Fukuki et al. ................... 260/897 A

*Primary Examiner*—J. Ziegler
*Attorney, Agent, or Firm*—Alan A. Csontos

[57] ABSTRACT

EP or EPDM polymers having a high ethylene content and a high ratio of ethylene units in runs of three or more to isolated ethylene units in the polymer are physically blended with crystalline polypropylene. The blends exhibit good tensile strength and modulus, and are useful to prepare molded products, tubing, liners, and like products.

7 Claims, No Drawings

THERMOPLASTIC POLYMER BLENDS OF EP OR EPDM POLYMER WITH CRYSTALLINE POLYPROPYLENE

BACKGROUND OF THE INVENTION

Polymer blends of ethylene-propylene (EP) polymers or of ethylene-propylene-diene (EPDM) polymers with poly-α-monoolefin polymers, particularly with polypropylene, are known to the art (see U.S. Pat. Nos. 3,036,987; 3,262,992; and 3,835,201, and British Pat. No. 958,079 and Canadian Pat. No. 602,151). Such blends are useful to prepare a broad range of molded products such as tubing, toys, and household and automotive items. For many applications, the item must have high structural integrity and good tensile strength. Unfortunately, polymer blends of EP or EPDM polymers with polypropylene often exhibit low tensile strengths. To achieve higher tensile strengths, curing or crosslinking agents have been added to such polymer blends to effect chemical changes in the blend (see U.S. Pat. Nos. 3,564,080; 3,758,643; and 3,803,558). The polymer blends of the present invention are thermoplastic physical blends of specific EP or EPDM polymers and crystalline polypropylene (PP) polymers, which blends exhibit unexpectedly superior tensile strength. No curing or crosslinking agents are used in the polymer blends.

SUMMARY OF THE INVENTION

Thermoplastic polymer blends comprising (1) an ethylene-propylene (EP) or ethylene-propylene-diene (EPDM) polymer having an ethylene content of at least about 65 percent by weight, a melt endotherm value of from about 2 to about 15 calories per gram, and an ethylene sequence index; i.e., the ratio of ethylene units in runs of three or more to isolated ethylene units, of from about 30/1 to about 70/1 and (2) a crystalline polypropylene (PP) polymer are prepared by physically mixing under heat and shear conditions the polymer components. The thermoplastic blends exhibit excellent tensile strengths, greater than that obtained from polymer blends made using EP or EPDM polymers having a low ethylene sequence index. No curing or crosslinking agents are used to obtain the superior tensile strengths of the thermoplastic blend.

DETAILED DESCRIPTION OF THE INVENTION

The thermoplastic polymer blends of this invention comprise a physical mixture of two polymer components; i.e., an ethylene-propylene (EP) or ethylene-propylene-diene (EPDM) polymer and a crystalline polypropylene (PP) polymer. The polymers are mixed in a range of from about 5 parts by weight to about 200 parts by weight of PP per 100 parts by weight of EP or EPDM polymer. The use of over 200 parts of PP per 100 parts of EP or EPDM in the polymer blend is not necessary to achieve the advantages of the present invention. Excellent results are obtained when the polypropylene polymer is admixed in a range of from about 25 parts to about 100 parts of PP per 100 parts of EP or EPDM.

The polymer blends are truly thermoplastic, exhibiting excellent strength and structural stability at ambient temperature but easily processable at temperatures above 160° C. A smooth roll is formed in milling operations, and the blends are readily extrudable and moldable, having good flow properties. Formed items made from the blends are reprocessable. In contrast to the thermoplastic blends disclosed in U.S. Pat. Nos. 3,564,080; 3,785,643; and 3,806,558; the polymer blends of the present invention do not need or use curing or crosslinking agents to effect partial cure of the polymer components. However, also in contrast to other known thermoplastic blends employing an EP or EPDM polymer, the EP or EPDM polymers used in the present invention are unique in having a high ethylene sequence index; i.e., a high ratio of ethylene units in runs of three or more to isolated ethylene units, which index is a measurable property of the polymer. Other properties of the unique polymer used are disclosed in the following discussion.

The polymer employed in the blends consists essentially of interpolymerized units of about 65 percent to about 85 percent by weight of ethylene, about 5 percent to about 35 percent by weight of propylene, and up to 10 percent by weight of a diene monomer. More preferably, the polymer consists essentially of from about 70 percent to about 80 percent by weight of ethylene, about 15 percent to about 30 percent by weight of propylene and up to 5 percent by weight of a diene monomer. The EP copolymer employed is comprised of interpolymerized units of ethylene and propylene monomers. The ethylene forms from about 65% to about 85% by weight of the polymer, the propylene forming the remaining about 15% to about 35% by weight. More preferably, the ethylene content of the copolymer is from about 70% to about 80% by weight of the polymer. The EPDM polymer employed in comprised of interpolymerized units of ethylene, propylene and diene monomers. The ethylene forms from about 65% to about 85% by weight of the polymer, the propylene from about 5% to about 35% by weight, and the diene from about 0.5% to about 10% by weight, all based upon the total weight of the EPDM polymer. More preferably, the ethylene content is from about 70% to about 80% by weight, the propylene content is from about 15% to about 29% by weight, and the diene content is from about 1% to about 5% by weight of the EPDM polymer. Examples of the diene monomers are: conjugated dienes such as isoprene, butadiene, chloroprene, and the like; and nonconjugated dienes, containing from 5 to about 25 carbon atoms, such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclonondienes such as 3-methyl-bicyclo-(4,2,1)nona-3,7-diene, 3-ethyl-bicyclonondiene, and the like; indenes such as methyl tetrahydroindene, and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, and the like; and tricyclo dienes such as 3-methyl-tricyclo-$(5,2,1,0^{2.6})$-3,8-decadiene, and the like. The more preferred dienes are the nonconjugated diene monomers containing from 5 to about 25 carbon atoms. Particularly good results are obtained when alkenyl norbornenes are used as the diene monomer. The EP and EPDM polymers are readily prepared using polymerization techniques known to the art such as described in U.S. Pat. No. 3,646,169.

The EP or EPDM polymers also exhibit a melt endotherm of from about 2 to about 15 calories/gram, and more preferably, from about 4 to about 10 calories/gram. The melt endotherm is measured using a Differential Scanning Calorimeter (DSC) such as that sold by DuPont as the DuPont 900 Thermal Analyzer. The test measures orientation within the polymer. A sample of polymer of known weight is placed in a closed aluminum pan (DSC cell calorimeter pans supplied by DuPont were used). The polymer sample is then heated at a rate of 10° C./minute over a temperature range of from −100° C. to +75° C. The reference material used is glass beads. The DSC chart is precalibrated, using metals with known heats of fusion, to provide a chart having a unit area in terms of calories/square inch/minute. As the polymer sample is heated, a crystalline melt point peak will show on the chart. The area under the crystalline melt point peak is measured, and the melt endotherm in calories/gram is calculated from the area obtained. Two melt endotherm measurements can be obtained from one test; i.e., a measurement on heating the sample and a measurement on cooling down the sample.

A unique property of the EP and EPDM polymers employed in the blends with the polypropylene polymer is its high ethylene sequence index. This ethylene sequence index is a measurable value and can be expressed as the ratio of interpolymerized ethylene units in the polymer in runs of three or more units of ethylene to the number of isolated ethylene units; i.e., ethylene units having an interpolymerized propylene unit with head-to-tail configuration immediately adjacent to and on both sides of the ethylene unit. This ratio is determined using Nuclear Magnetic Resonance (NMR) spectroscopy and employing recently developed Carbon-13 Nuclear Magnetic Resonance techniques to determine monomer sequencing. These techniques are described and published in the Journal of Polymer Science:Symposium No. 43 (1973), pages 237 to 250 and by C. Carman et al in Rubber Chemistry and Technology, Vol. 44, No. 3 (1971), pages 781 to 804, and Macromolecules, Vol. 7 (1974), pages 789 to 793. The ratio of interpolymerized ethylene units in runs of three or more ethylene units to isolated ethylene units is measured directly from the Carbon-13 NMR spectrum of the EP or EPDM polymer sample. The Carbon-13 spectrum was obtained using standard Fourier transform pulsed NMR techniques employing the following parameters: sweep width of 6000 Hz., 16 K data points, 90° pulse angle of less than 16 $\mu$ sec. pulse width, 5 second repetition rate, at least 1000 transients. The EP or EPDM polymers were prepared as 10 or 20% weight per volume solutions in trichlorobenzene and the spectra obtained at 120° C. The ethylene sequence index is obtained by measuring the ratio of peak intensities of the carbon-13 resonance at 28 ppm to the carbon-13 resonance at 23 ppm (chemical shift is in parts per million relative to hexamethyldisiloxane). The EP and EPDM polymers used in the polymer blends of the invention have an ethylene sequence index; i.e., a ratio of ethylene units in runs of three or more to isolated ethylene units, of from about 30/1 to about 70/1, and more preferably, from about 35/1 to about 50/1.

The EP and EPDM polymers are high molecular weight, solid elastomers. They have a dilute solution viscosity (DSV) of about 1.3 to about 4.5 measured at 25° C. as a solution of 0.2 gram of polymer per deciliter of toluene. The raw polymer has a green strength tensile of about 300 psi minimum to about 1800 psi, and, more typically, from about 800 psi to about 1600 psi, and an elongation at break of at least about 600 percent.

The polypropylene employed is an isotactic, highly crystalline polymer having a melt flow rate of from 1 to about 20 grams/10 min. at 230° C. and a crystalline content of from about 40 percent to about 80 percent. The polymer typically has tensile yield strengths of about 5000 psi or above. Polypropylenes having up to 10 percent by weight of interpolymerized units of another $\alpha$-olefin monomer can also be used. The polypropylenes are commercially available, and can be readily prepared using standard polymerization techniques known to the art (see the Encyclopedia of Polymer Science and Technology, Vol. 11 (1966), page 601 et seq.). As mentioned before, the polypropylene is used at from about 5 parts to about 200 parts by weight with 100 parts by weight of the EP or EPDM polymer. Particularly good results are obtained when the PP is used at about 25 parts to about 100 parts by weight with 100 parts by weight of EP or EPDM polymer.

The composition of the invention comprises a physical blend of the EP or EPDM polymer and polypropylene (PP) polymer. No cure or crosslinking agents are employed. It was unexpected that the thermoplastic polymer blend of the two polymeric components would exhibit a tensile strength greater than that obtained from similar polymer blends where the EP or EPDM polymer has a low ethylene sequence index.

The polymer blends are truly thermoplastic, moldable and remoldable at temperatures of above 160° C, preferably at about 170° C. to about 220° C., yet having a strong, flexible plastic nature at room temperatures.

A wide range of rubber and plastic compounding ingredients are readily mixed with the thermoplastic polymer blends using mixing equipment such as two-roll mills, extruders, banbury mixers, and the like. Standard mixing and addition techniques are used.

Examples of compounding ingredients are metal oxides like zinc, calcium, and magnesium oxide, lead monoxide and dioxide, fatty acids such as stearic and lauric acid, and salts thereof such as cadmium, zinc and copper stearate and lead oleate; fillers such as the carbon blacks like channel blacks, high reinforcing blacks as N110 and N330, low reinforcing blacks as N550 and N770, and thermal blacks as N880 and N990, calcium and magnesium carbonates, calcium and barium sulfates, aluminum silicates, phenol-formaldehyde and polystyrene resins, asbestos, and the like; plasticizers and extenders; ASTM type 2 petroleum oils, ASTM D2226 aromatic, naphthalenic and paraffinic oils, castor oil, tall oil, glycerin, and the like; antioxidants, antiozonants, and stabilizers such as di-$\beta$-naphthyl-p-phenylenediamine, phenyl-$\beta$-naphthylamine, dioctyl-p-phenylenediamine, N-1,3-dimethylbutyl-N-phenyl-p-phenylenediamine, 4-isopropylamino diphenylamine, 2,6-di-t-butyl paracresol, 2', 2'-methylenebis-(4-ethyl-6-t-butyl phenol), 2,2'-thiobis-(4-methyl-6-t-butyl phenol), bisphenol-2,2'-methylenebis-6-t-butyl-4-ethylphenol, 4,4'-butylidenebis-(6-t-butyl-m-cresol), 2-(4-hydroxy-3,5-t-butylaniline)-4,6-bis(octylthio)-1,3,5-triazine, hexahydro-1,3,5-tris-$\beta$-(3,5-di-t-butyl-4-hydroxyphenyl)-propionyl-s-triazine, tris-(3,5-di-t-butyl-4-hydroxybenzyl)isocyanurate, tetrakismethylene-3-(3',5'-di-t-butyl-4'-hydroxyphenyl)propionate methane, distearyl thiodipropionate, dilauryl thiodipropionate, tri(nonylatedphenyl)phosphite, and the like; and other ingredients such as pigments, tackifiers, flame retardants, fungicides, and the like. Such ingredients are used in levels well known to those skilled in the art.

Applications for the thermoplastic polymer blends include tubing, liners, wire and cable insulation, mats, and molded items such as shoe soles, toys, kitchen ware, exterior automotive parts, and the like.

The blends were evaluated for their stress-strain properties; i.e., tensile, modulus, and elongation, following ASTM procedure D-412 (using a pull rate of 20 inches/minute).

The following examples are presented to further illustrate the invention. Unless otherwise stated, the ingredients recited in the recipes are used in parts by weight.

EXAMPLES

The polymeric components of the blends, along with compounding ingredients, if used, were mixed together using a banbury mixer at a temperature of about 350° F. (177° C.). The EP or EPDM was added to the banbury mixer and the other polymeric and compounding ingredients (if used) then added to the polymer blend. Total mixing time was about 5 minutes. The composition was removed from the banbury and then sheeted on a two-roll mill at a temperature of about 100° C.

The mixing conditions and temperatures outlined above are not critical. The important factor is to get uniform dispersion of the polymers and ingredients in the thermoplastic blend. This can be accomplished using other equipment, such as a two-roll mill, by mixing at other temperatures and for other times, and the like; all of which conditions and procedures are well known to the artisan. The above conditions were used to achieve good, thorough mixing, and are outlined to illustrate the preparation of the physical blends of the examples.

EXAMPLE I

EP or EPDM polymers of the invention were mixed with a crystalline PP polymer (sold by Eastman Chemical as Tenite 4241) and the resulting thermoplastic blend evaluated for its tensile strength and elongation. For comparative purposes, other EPDM and EP polymers having properties outside of the scope of the definition for the polymers of the invention were also mixed with the same PP polymer and the blends evaluated. The PP polymer used to prepare the blends has a density of about 0.90 g./cc., a melt flow rate of about 9 grams/10 minutes at 230° C., and a tensile yield strength of about 5200 psi and an elongation of about 10 percent. The EP and EPDM polymers employed are identified as follows:

The EPDM and EP polymers and PP polymer were blended together using a Banbury mixer operating at a temperature of about 350° F. (177° C). The samples for tensile and elongation measurements were injection molded at 400° F. (204° C.). The recipes used and data obtained are as follows:

|  | 1 | 2 | 3 | 4 | 5 | 6 | 7 | 8 |
|---|---|---|---|---|---|---|---|---|
| EPDM-1 | 100 | — | — | — | — | — | — | — |
| EP-2 | — | 100 | — | — | — | — | — | — |
| EP-3 | — | — | 100 | — | — | — | — | — |
| EPDM-4 | — | — | — | 100 | — | — | — | — |
| EPDM-5 | — | — | — | — | 100 | — | — | — |
| EPDM-6 | — | — | — | — | — | 100 | — | — |
| EPDM-7 | — | — | — | — | — | — | 100 | — |
| EP-8 | — | — | — | — | — | — | — | 100 |
| Tenite 4241 | 50 | 50 | 50 | 50 | 50 | 50 | 50 | 50 |
| Tensile Yield Strength, psi | 1450 | 1610 | 1450 | 1300 | 1190 | 1180 | 1090 | 1100 |
| Elongation, percent | 90 | 220 | 130 | 130 | 90 | 100 | 110 | 110 |
| Hardness, Durometer A | 90 | 91 | 89 | 83 | 90 | 85 | 85 | 88 |

Samples 1, 2, and 3, thermoplastic polymer blends of the present invention, have excellent tensile strength. The measured tensile strength is unexpectedly superior to those of the other blends.

EXAMPLE II

The experimentation in Example I was repeated using polypropylene polymers having melt flow rates (M.F.) at 230° C. of 18, 9, and 4, respectively. All three blends contained an EPDM polymer having a tensile strength of 1050 psi, an elongation of 800 percent, a composition of 71% ethylene, 25% propylene, and 4% ethylidene norbornene, a melt endotherm of about 4.6 calories/gram, and an ethylene sequence index of about 37/1.

|  | 1 | 2 | 3 |
|---|---|---|---|
| EPDM, parts | 100 | 100 | 100 |
| Polypropylene, parts |  |  |  |
| Tenite 4250 G, M.F. 18 | 50 | — | — |
| Tenite 4250 G, M.F. 9 | — | 50 | — |
| Profax 6523, M.F. 4 | — | — | 50 |
| Tensile strength, psi | 1700 | 1780 | 1820 |
| Elongation, percent | 100 | 240 | 130 |
| Hardness, Durometer A | 92 | 93 | 93 |

EXAMPLE III

The comparisons made in Example I were essentially repeated using different EPDM polymers. Again, the polymer blends prepared using EPDM polymers having a high ethylene sequence index exhibited the highest tensile strengths (samples 1, 2, 6 and 7 versus samples 3, 4, 5, 8, 9, and 10).

|  | Tensile Strength (psi) | Elongation % | Melt Endotherm (calories/g.) | Weight Percent Monomers | | | Ethylene Sequence Index (Ratio of Runs of 3 or More Ethylene Units/One Ethylene Unit in Polymer) |
|---|---|---|---|---|---|---|---|
|  |  |  |  | Ethylene | Propylene | Diene[b] |  |
| EPDM-1 | 1170 | 800[a] | 5.2[a] | 70 | 26 | 4 | 38/1 |
| EP-2 | 1090 | 700 | over 2 | 70 | 30 | — | 37/1 |
| EP-3 | 280 | 860 | 6.2[a] | 69 | 31 | — | 36/1 |
| EPDM-4 | 130 | 1400 | — | 63 | 33 | 4 | 17/1 |
| EPDM-5 | 75[a] | 500[a] | 0 | 58 | 38 | 4 | — |
| EPDM-6 | 100 | 250[a] | 0 | 58 | 33 | 9 | — |
| EPDM-7 | 50[a] | 500[a] | 0 | 58 | 38 | 4 | — |
| EP-8 | 25[a] | 500[a] | 0 | 50 | 50 | — | — |

[a]Average data
[b]Diene monomer used is 5-ethylidene-2-norbornene

|  | 1 | 2 | 3 | 4 | 5 | 6 | 7 | 8 | 9 | 10 |
|---|---|---|---|---|---|---|---|---|---|---|
| EPDM-9[a] | 100 | — | — | — | — | 100 | — | — | — | — |
| EPDM-10[b] | — | 100 | — | — | — | — | 100 | — | — | — |
| EPDM-11[c] | — | — | 100 | — | — | — | — | 100 | — | — |
| EPDM-12[d] | — | — | — | 100 | — | — | — | — | 100 | — |
| EPDM-5 | — | — | — | — | 100 | — | — | — | — | 100 |
| Polypropylene[e] | 50 | 50 | 50 | 50 | 50 | 100 | 100 | 100 | 100 | 100 |
| Tensile, Yield, psi | 1800 | 1870 | 1660 | 1630 | 1480 | 2630 | 2800 | 2430 | 2340 | 2370 |
| Elongation, percent | 240 | 170 | 50 | 100 | 80 | 50 | 90 | 120 | 90 | 70 |
| Hardness, Durometer D | 39 | 42 | 27 | 32 | 28 | 51 | 54 | 44 | 46 | 45 |

[a] Same EPDM polymer used in Example II.
[b] 75% ethylene, 22% propylene, 3% 1,4-hexandiene terpolymer having a tensile of 1610 psi, an elongation of 800 percent and an ethylene sequence index of 68/1.
[c] 65% ethylene, 31% propylene, 4% ethylidene norbornene, terpolymer having a tensile strength of 45 psi, an elongation of about 1400 percent, no melt endotherm, and an ethylene sequence index of 13/1.
[d] 69% ethylene, 27% propylene, 4% dicyclopentadiene terpolymer having a tensile of about 160 psi, an elongation of about 250 percent, and an ethylene sequence index of 24/1.
[e] Highly crystalline polypropylene having a melt flow rate of about 9 grams/10 minutes at 230° C.

EXAMPLE IV

An EPDM polymer of the invention was blended with PP polymer at various levels of PP polymer to EPDM polymer. The polymers were mixed for 4 minutes in a Banbury mixer operating at 350° F. (177° C.). The resulting thermoplastic blends exhibited excellent tensile strengths. The data shows that, generally, the use of over 50 parts by weight of PP polymer per 100 parts of EPDM polymer is necessary to achieve the optimum tensile properties of the blends.

|  | 1 | 2 | 3 | 4 | 5 | 6 | 7 |
|---|---|---|---|---|---|---|---|
| EPDM[a] | 90 | 80 | 70 | 60 | 50 | 44 | 40 |
| PP[b] | 10 | 20 | 30 | 40 | 50 | 56 | 60 |
| Parts of PP per 100 EPDM | 11 | 25 | 43 | 67 | 100 | 125 | 150 |
| Tensile Strength, psi | 770 | 1300 | 1610 | 1760 | 1890 | 2210 | 2460 |
| Elongation, percent | 330 | 470 | 220 | 190 | 130 | 80 | 50 |

[a] EPDM polymer of 73% ethylene/23% propylene/4% ethylidene-2-norbornene having a tensile strength of 1170 psi and an elongation of 800 percent, and an ethylene sequence index of 38/1.
[b] Polypropylene having a density of about 0.90 g./cc., a melt flow rate of 4 g./10 minutes at 190° C., a 5720 psi tensile, and a 10 percent elongation; sold as Profax 6323 by Hercules, Inc.

EXAMPLE V

Many types of standard rubber and plastic compounding ingredients can be mixed with the thermoplastic polymer blends of the invention, particularly fillers and reinforcing agents, antioxidants and stabilizers, and plasticizers, and lubricants. The compounding ingredients can be added using procedures and in amounts well known to those skilled in the art. The EPDM polymer and PP polymer used are similar to those employed in sample 2 of Example II.

|  | 1 | 2 | 3 | 4 | 5 | 6 |
|---|---|---|---|---|---|---|
| EPDM | 100 | 100 | 100 | 100 | 100 | 100 |
| Polypropylene | 50 | 50 | 50 | 100 | 100 | 100 |
| Sunpar 2280[a] | 20 | — | — | 50 | — | — |
| Sunthene 4240[b] | — | 20 | — | — | 50 | — |
| Sundex 790[c] | — | — | 20 | — | — | 50 |
| Tensile, psi | 1360 | 1360 | 1340 | 1570 | 1310 | 1660 |
| Elongation, percent | 210 | 190 | 150 | 220 | 390 | 350 |
| Hardness, Durometer A | 84 | 85 | 85 | 91 | 90 | 90 |

[a] paraffinic oil, 2910 S.U.S. viscosity at 100° F.
[b] naphthenic oil, 2210 S.U.S. viscosity at 100° F.
[c] aromatic oil, 3000 S.U.S. viscosity at 100° F.

I claim:

1. A thermoplastic polymer blend comprising (1) a polymer consisting essentially of interpolymerized units of about 65 percent to about 85 percent by weight of ethylene, about 5 percent to about 35 percent by weight of propylene, and up to about 10 percent by weight of a diene monomer; said polymer having an ethylene sequence index of from about 30/1 to about 70/1 and a melt endotherm value of about 2 to about 15 calories per gram and (2) from about 5 parts to about 200 parts by weight per 100 parts by weight of the EPDM polymer, of a crystalline polypropylene polymer.

2. A thermoplastic polymer blend of claim 1 wherein the polymer consists essentially of interpolymerized units of from about 70 percent to about 80 percent by weight of ethylene, about 15 percent to about 30 percent by weight of propylene, and up to about 5 percent by weight of a nonconjugated diene monomer containing from 5 to about 25 carbon atoms in the monomer.

3. A thermoplastic polymer blend of claim 2 wherein the crystalline polypropylene polymer is present in from about 25 parts to about 100 parts by weight per 100 parts by weight of the polymer.

4. A thermoplastic polymer blend of claim 3 wherein the polymer consists essentially of interpolymerized units of from about 70 percent to about 80 percent by weight of ethylene and about 20 percent to about 30 percent by weight of propylene, said polymer having an ethylene sequence index of from about 35/1 to about 50/1 and having a melt endotherm valve of from about 4 to about 4 to about 10 calories/gram.

5. A thermoplastic polymer blend of claim 4 comprising (1) a polymer consisting essentially of interpolymerized units of about 70 percent by weight of ethylene and about 30 percent by weight of propylene, and (2) from about 25 parts to about 100 parts by weight per 100 parts by weight of the polymer of a crystalline polypropylene polymer having a density of about 0.90 gram/cc.

6. A thermoplastic polymer blend of claim 3 wherein the polymer consists essentially of interpolymerized units of from about 70 percent to about 80 percent by weight of ethylene, from about 15 percent to about 29 percent by weight of propylene, and from about 1 percent to about 5 percent by weight of alkenyl norbornene monomers, said polymer having an ethylene sequence index of from about 35/1 to about 50/1 and having a melt endotherm value of from about 4 to about 10 calories/gram.

7. A thermoplastic polymer blend of claim 6 comprising (1) a polymer consisting essentially of interpolymerized units of about 73 percent by weight of ethylene, about 23 percent by weight of propylene, and about 4 percent by weight of 5-ethylidene-2-norbornene, and (2) from about 25 parts to about 100 parts by weight per 100 parts by weight of the polymer, of a crystalline polypropylene polymer having a density of about 0.90 gram/cc.

* * * * *